United States Patent [19]

Novak

[11] 4,097,553

[45] Jun. 27, 1978

[54] ACRYLIC GRAFT COPOLYMERS BLENDED WITH ACRYLIC RESINS

[75] Inventor: Ernest Richard Novak, Vienna, W. Va.

[73] Assignee: E. I. Du Pont de Nemours and Company, Wilmington, Del.

[21] Appl. No.: 808,396

[22] Filed: Jun. 20, 1977

[51] Int. Cl.² ................ C08L 51/00; C08L 53/00
[52] U.S. Cl. ................. 260/876 R; 260/29.6 RB; 260/29.6 RW; 260/885
[58] Field of Search ........... 260/876 R, 885, 29.6 RB, 260/29.6 RW

[56] References Cited

U.S. PATENT DOCUMENTS

| | | | |
|---|---|---|---|
| 3,502,604 | 3/1970 | Nakatsuka | 260/29.6 |
| 3,793,402 | 2/1974 | Owens | 260/870 R |
| 3,804,925 | 4/1974 | Kato et al. | 260/885 |

*Primary Examiner*—Richard B. Turer

[57] ABSTRACT

A process which improves the handleability of resilient, acrylic graft rubber particles which comprises coagulating the rubber particles, then contacting the coagulated particles in the coagulation medium with a dispersion of a non-resilient alkyl methacrylate resin and coagulating the alkyl methacrylate resin on the surface of the rubber particles. The particles of alkyl methacrylate resin adhere to the rubber particles and prevent the normally sticky rubber particles from adhering to one another.

5 Claims, No Drawings

ACRYLIC GRAFT COPOLYMERS BLENDED WITH ACRYLIC RESINS

FIELD OF THE INVENTION

This invention relates to resilient, thermoplastic acrylic graft rubbers. More particularly, this invention is directed to a process which results in improved handleability of such rubbers.

BACKGROUND OF THE INVENTION

Acrylic graft rubbers are compounded with hard, non-resilient methacrylate polymers to provide impact-resistant resins. During drying, storage and shipment, prior to compounding, the resilient acrylic graft rubber particles tend to stick together, and are difficult to handle. Heretofore, the resin particles were sometimes coated with particulate materials, such as silica, talc, sodium carbonate, calcium carbonate or titanium dioxide, to reduce their sticking tendency. However, use of these particulate materials has a deleterious effect on the properties of sheets or other articles made from impact-resistant resins compounded using such coated acrylic rubbers, such as decreased light transmission and embrittlement. Thus, a better means for improving the handleability, i.e., reducing the sticking tendency, of the acrylic rubber particles is desirable.

SUMMARY OF THE INVENTION

In this invention, a material whose composition is compatible with the composition of the resilient, acrylic graft rubber is coagulated onto the surface of rubber particles which have themselves been coagulated but not removed from the coagulation medium. Thus, the deleterious effect on properties caused by using the inorganic particulate materials recited above is overcome by employing the compatible material. The compatible material is a substantially non-resilient alkyl methacrylate resin.

More particularly, this invention is a method for improving the handleability of a resilient, acrylic graft rubber composed of particles having an outer layer which has a glass transition temperature greater than 25° C., consisting essentially of an alkyl methacrylate polymer and the alkyl group has 1–4 carbon atoms which method comprises mixing the acrylic graft rubber while still in its emulsion polymerization medium with a solution of an ionizable salt in which the salt is present in an amount between about 1 and 100 gm/liter in an amount such that the resulting mixture contains between about 5 and about 25 times by weight as much acrylic graft rubber as ionizable salt, and, agitating the resulting mixture at a temperature between about 30°–70° C. until the graft rubber particles coagulate, then adding to the coagulated dispersion a dispersion of an alkyl methacrylate resin prepared by emulsion polymerization which has a glass transition temperature greater than 25° C. and wherein the alkyl group has 1–4 carbon atoms in an amount sufficient to result in the presence of between about 10 and 99% by weight acrylic graft rubber in the resulting mixture based on weight of rubber and said alkyl methacrylate resin, and agitating the resulting mixture at a temperature between about 60°–120° C., followed by isolating the coagulated materials.

Surprisingly, the sticking tendency of the resilient, acrylic graft rubber is not significantly decreased by applying particles of compatible alkyl methacrylate resin to isolated particles of resilient acrylic rubber or by co-coagulating the compatible alkyl methacrylate resin with the resilient acrylic rubber particles. It is only when the compatible alkyl methacrylate resin is subsequently coagulated in the presence of previously coagulated resilient, acrylic rubber particles, that the handleability of the acrylic rubber is significantly improved.

DETAILED DESCRIPTION OF THE INVENTION

The resilient acrylic graft rubbers that can be employed herein are well known and are prepared by a multi-stage, sequential emulsion polymerization process in which the core of the particles is first produced by polymerizing a desired monomer or monomers, followed by polymerizing another set of desired monomers in the presence of the core particles to form a shell around the core. In many instances, still another set of monomers is polymerized in the presence of the core-shell particles to form another shell, while in other instances, additional sets of monomers can be likewise polymerized to ultimately form graft rubber particles having a core and multiple surrounding shells.

A common characteristic of all such resilient acrylic graft rubbers is that the outermost shell is composed of a relatively hard, non-resilient alkyl methacrylate polymer (homopolymer or copolymer), and that at least one of the inner shells or the core is composed of resilient, relatively soft acrylate copolymer to impart the resilient property to the graft rubber. Glass transition temperature is an indication of hardness or non-resiliency and the alkyl methacrylate outer shell has a glass transition temperature greater than 25° C., while the resilient acrylate copolymer has a glass transition temperature of 25° C. or less.

The relatively hard, non-resilient alkyl methacrylate outer shell is ordinarily a polymer polymerized in emulsion from a monomer mixture of about 50 to 100 weight percent (preferably 85–100%) of an alkyl methacrylate wherein the alkyl group has 1–4 carbon atoms and any remainder is styrene and/or an alkyl acrylate wherein the alkyl group has 1–4 carbon atoms. The alkyl methacrylate outer shell polymer has a glass transition temperature greater than 25° C., and preferably greater than 50° C.. Most preferably the outer shell contains at least 90% alkyl methacrylate, and is a copolymer of methyl methacrylate and ethyl acrylate. The amount of outer shell present in the graft rubber may be between about 10–30% by weight of the rubber.

Ordinarily, at least one of the inner shells or the core is a resilient, acrylate copolymer polymerized in emulsion from a monomer mixture of about 70–90 weight percent alkyl acrylate wherein the alkyl group has 1–4 carbon atoms and the remainder is a copolymerizable monomer which may be styrene, hydroxy lower alkyl acrylates and methacrylates, lower-alkyl substituted styrenes and the like. Lower alkyl is defined as alkyl of 1–4 carbon atoms. The acrylic copolymer has a glass transition temperature of 25° C. or less, and preferably 10° C. or less. The amount of the resilient copolymer in the graft rubber is sufficient to impart resiliency to the rubber, and ordinarily may be between about 45–80%, preferably 50–70% by weight of the rubber.

It is understood that the core and inner layer polymers will also contain minor amounts of graft or cross-linking monomers in order to insure adhesion between adjacent layers. It is also understood that in these resilient, acrylic graft rubbers, the core and the shell layers alternate between soft, resilient polymers and hard, non-resilient polymers, provided that the outermost shell of the rubber particles is composed of a hard, non-resilient polymer that is compatible with the resin with which the rubber is to be blended. With these requirements, it is understood that neither the compositions of the polymers in the acrylic graft rubber nor the number of layers of polymers is otherwise critical to the operation of the process of this invention. The process is useful to reduce the sticking tendency of any such acrylic graft rubber.

The resilient, impact-resistant acrylic resins can be prepared by emulsion polymerization as described in Owens, U.S. Pat. No. 3,793,402, U.S. Pat. No. 3,502,604 or U.S. Pat. No. 3,804,925.

The compatible material used in the process of this invention that is coagulated onto the surface of the resilient, acrylic graft rubber particles is an alkyl methacrylate resin (homopolymer or copolymer) prepared by emulsion polymerization wherein the alkyl group has 1–4 carbon atoms and the resin has a glass transition temperature greater than 25° C., preferably greater than 50° C. (thus it is a non-resilient polymer). This alkyl methacrylate resin can contain 50–100 percent by weight alkyl methacrylate (preferably 85–100 percent), with any remainder being an alkyl acrylate wherein the alkyl group has 1–4 carbon atoms. Preferably the compatible material is a copolymer of alkyl methacrylate and alkyl acrylate and most preferably about 95 percent by weight methyl methacrylate and 5 percent by weight ethyl acrylate.

In the process of this invention the resilient, acrylic graft rubber is first coagulated but is not isolated from its polymerization medium. Coagulation is achieved by known coagulation procedures, such as contacting the polymerization mixture containing the acrylic resin with a solution of an ionizable salt, such as magnesium sulfate or calcium acetate, and agitating the resulting mixture at about 30°–70° C. until the polymer coagulates. The amount of ionizable salt in the solution is preferably between 1 and 100 gm/liter, preferably 2.5 to 25 gm/liter. Generally, the resulting medium will contain between about 5 and about 25, preferably 10–20, times as much rubber as salt, based on weight.

Next a dispersion of the compatible alkyl methacrylate resin is added and the resulting mixture agitated at about 60°–120° C. until the compatible alkyl methacrylate polymer coagulates. The polymer content of the dispersion is not critical so long as sufficient polymer is present in the dispersion which when combined with the coagulated acrylic graft rubber results in a mixture containing between 10–99% by weight resilient acrylic rubber based on combined weight of acrylic rubber and compatible alkyl methacrylate resin. Preferably, the mixture will contain between 30 and 99% by weight resilient acrylic rubber and most preferably, 70–98% resilient acrylic rubber, based on combined weight of acrylic rubber and compatible alkyl methacrylate resin.

Pressure is not critical and both coagulations are ordinarily carried out at atmospheric pressure. Moreover the process can be batch or continuous.

The coagulated acrylic rubber particles coated with the compatible alkyl methacrylate resin are isolated from the coagulation liquor by ordinary procedures such as filtering and drying, or spray drying.

The resilient, graft acrylate rubber obtained by the process of this invention is useful in the same applications are previously known resilient, acrylic graft rubbers. Thus, the rubber is usually compounded with a hard, non-resilient methacrylate resin as described in Owens, U.S. Pat. No. 3,793,402 to obtain a resin that is molded or extruded into thermoplastic articles such as sheets, films or other articles of good mechanical strength and weatherability.

The following examples serve to illustrate the invention described hereinabove.

EXAMPLE 1

Part I—Preparation of resilient, acrylic graft rubber

A three phase resin in which 25% of its weight is hard, non-resilient methacrylate polymer, 55% is soft, resilient acrylic polymer, and 20% is hard, non-resilient methacrylate polymer was prepared by combining 15.0 parts methyl methacrylate, 9.9 parts ethyl acrylate, and 0.10 part allyl methacrylate (a graft-linker) to form a first monomer charge. The charge was emulisified in water using sodium dioctyl sulfosuccinate as the emulsifier. The monomers were polymerized using potassium persulfate as the initator to obtain a hard, non-resilient resin having a glass transition temperature greater than 25° C.

A second monomer charge was made of 43.45 parts butyl acrylate, 10.18 parts styrene, 1.1 parts allyl methacrylate (graft-linker) and 0.27 parts methacrylic acid. The charge was added to the preformed polymer emulsion obtained above and polymerized using potassium persulfate as the initiator to obtain a soft, resilient polymer layer around the core formed by the first charge and grafted thereto. The resilient polymer has a glass transition temperature of 25° C. or less.

A third monomer charge of 19 parts methyl methacrylate and 1 part ethyl acrylate was then added to the polymer emulsion obtained above and was polymerized using potassium persulfate initiator to obtain a hard, non-resilient shell around the previous prepared particles and grafted thereto, which shell had a glass transition temperature greater than 25° C. The resulting resilient acrylic graft rubber so produced comprised about 35 percent solids in the polymerization mixture.

Part II—Coagulation According to the Procedure of this Invention 16,000g of the polymerization mixture containing the resilient acrylic graft rubber produced as described above was coagulated at 45° by mixing the polymerization mixture into 75 liters of water containing 600g of Epsom salt (magnesium sulfate heptahydrate). The temperature of the resulting coagulated slurry was raised to 60° C. and 4000g of a 35% solids containing dispersion of methyl methyacrylate/ethyl acrylate copolymer (MMA/EA), prepared by emulsion polymerization of a mixture of 95 parts MMA and 5 parts EA, was added. The MMA/EA copolymer coagulated on the surface of the acrylic graft rubber particles and the resulting coated product was isolated by filtering, and was then dried at 70° C. at about 20–25 inches of mercury vacuum.

After compaction by pressing at about 1 psi to simulate storage and shipping conditions and storing at 40° C. for 96 hours the resin particles flowed freely and did not form a coherent mass.

COMPARISON A

Part I

For purposes of comparison, an acrylic graft rubber prepared as described in Part I of Example 1 was coagulated and isolated from the polymerization mixture. The rubber was compacted as in Example 1, Part II and stored at 35° C. for 67 hours. The resin exhibited poor flow properties because of the sticking tendency of the particles. This Part I shows the sticking tendency of untreated acrylic graft rubber particles.

Part II

In another comparison, an acrylic graft rubber prepared as described in Part I of Example 1 was coagulated and isolated from the polymerization mixture and then mixed with solid particles of a suspension polymerized copolymer of 95% (by weight) MMA and 5% EA.

When 95% by weight of the mixture was the acrylic rubber and 5% was the MMA/EA polymer, and the mixture was compacted as in Example 1, Part II and stored at 20° C. for 66 hours, the mixture exhibited poor flow properties because of the sticking tendency of the acrylic rubber particles.

When the amount of the MMA/EA copolymer in the mixture was increased to 40%, and the mixture was compacted as in Example 1, Part II and stored at 20° C. for 64 hours, the flow properties of the mixture were improved, but not to the point where the mixture could be stored without considerable agitation to prevent sticking.

This Part II shows that the sticking tendency of the acrylic rubber particles to form a solid mass is not substantially reduced by interspersing among the rubber particles, other hard non-sticking particles.

Part III

In another comparison, an acrylic graft rubber emulsion was prepared as described in Part I in Example 1, and diluted with water. A monomer mixture of 95% by weight MMA and 5% by weight EA was added along with a small amount of a surfactant (dioctyl ester of sulfosuccinnic acid) and polymerized in the presence of the acrylic rubber particles. The MMA and EA polymerized onto the acrylic rubber particles and increased the size of the outer shell of the acrylic rubber from 20 to 37% of the total weight of the acrylic rubber particles. The resulting rubber, after being coagulated and dried, exhibited poor flow properties and needed considerable agitation to cause flow after only 2 hours of storage after compaction as described in Example 1, Part II. This Part III shows that the sticking tendency of the acrylic rubber is not substantially reduced by increasing the thickness of the hard, non-resilient shell of the acrylic rubber particle.

Part IV

In still another comparison, an acrylic graft rubber emulsion was prepared as described in Part I of Example 1. To 15,600 gm of said emulsion was added, 24,400 gm of an emulsion containing 35% by weight of a copolymer of 95% by weight MMA and 5% by weight EA. Then the solids in the resulting emulsion were simultaneously coagulated as described in Part II of Example 1, isolated, and dried. The product exhibited poor flow properties. This Part IV shows that the sticking tendency of the acrylic rubber is not substantially reduced by co-coagulation of the rubber and a resin made of hard, non-resilient, non-sticky particles.

EXAMPLE 2

A polymerization mixture prepared as described in Part I of Example 1 was coagulated and treated with an MMA/EA dispersion as described in Part II of Example 1. The amount of the MMA/EA dispersion employed was varied to result in a coated product containing the following amounts of resilient acrylic graft rubber and MMA/EA coating (% based on weight):

Sample 1—Control (no hard resin coagulated onto the acrylic rubber)
Sample 2—% acrylic rubber 80
  % MMA/EA polymer 20
Sample 3—% acrylic rubber 91
  % MMA/EA polymer 9
Sample 4—% acrylic rubber 95
  % MMA/EA polymer 5
Sample 5—% acrylic rubber 98
  % MMA/EA polymer 2

The tack temperature of the samples was measured. Tack temperature is the temperature at which the particles begin to stick together as measured in a melting point apparatus (No. 3821, Parr Instruments Co., Inc., Moline, Ill.). Thus, unlike the tests used in Example 1 and the Comparisons, (which simulate storage conditions) the tack temperature is a measure of tackiness when the particles are not subjected to pressure caused by the presence of other particles. The tack temperatures for the samples was as follows (accuracy ±3° C.):

Sample 1—74° C.
Sample 2—103° C.
Sample 3—102° C.
Sample 4—105° C.
Sample 5—102° C.

These results are significant because the acrylic graft rubbers are ordinarily dried at temperatures of 70° C. or above. Thus, samples produced by the process of this invention (Samples 2–5) can be dried without sticking, whereas, as seen by the Table, Sample 1 would tend to stick at 74° C..

I claim:

1. A method of improving the handleability of a resilient, acrylic graft rubber composed of particles having an outer layer consisting essentially of an alkyl methacrylate polymer which has a glass transition temperature greater than 25° C. and the alkyl group has 1–4 carbon atoms, and at least one inner layer consisting essentially of a resilient acrylic copolymer that has a glass transition temperature of 25° C or less which comprises mixing the acrylic graft rubber while still in its emulsion polymerization medium with a solution of an ionizable salt in which the salt is present in an amount between about 1 and 100 gm/liter in an amount such that the resulting mixture contains between about 5 and about 25 times by weight as much acrylic graft rubber as ionizable salt, and, agitating the resulting mixture at a temperature between about 30°–70° C. until the graft rubber particles coagulate, then adding to the coagulated dispersion a dispersion of an alkyl methacrylate resin prepared by emulsion polymerization which has a glass transition temperature greater than 25° C. and the alkyl group has 1–4 carbon atoms, in an amount sufficient to result in the presence of between about 10 and 99% by weight acrylic graft rubber in the resulting mixture based on weight of rubber and said alkyl methacrylate resin, and agitating the resulting mixture at a temperature between about 60°–120° C., followed by isolating the coagulated materials.

2. The method of claim 1 wherein the alkyl methacrylate polymer in said outer layer is produced from a monomer mixture of about 50 to 100 weight percent alkyl methacrylate and any remainder is selected from styrene, alkyl acrylate wherein the alkyl group has 1–4 carbon atoms, or a mixture thereof; wherein the resilient acrylic copolymer is produced from a monomer mixture of about 70–90 weight percent alkyl acrylate wherein the alkyl group has 1–4 carbon atoms and the remainder is a copolymerizable monomer selected from styrene, hydroxy-lower alkyl acrylate, hydroxy-lower alkyl methacrylate, and lower alkyl substituted styrene, and wherein the resilient acrylic copolymer is present in at least one inner layer that is adjacent to the outer layer.

3. The method of claim 2 wherein the alkyl methacrylate polymer in said outer layer is a copolymer produced from a monomer mixture of at least 90 weight % methyl methacrylate with the remainder being ethyl acrylate; the resilient acrylic copolymer is a copolymer produced from a monomer mixture of 70–90 weight % butyl acrylate with the remainder being styrene; and the alkyl methacrylate resin employed in the dispersion of an alkyl methacrylate resin is a copolymer produced from a monomer mixture of at least 95 weight % methyl methacrylate with the remainder being ethyl acrylate.

4. The method of claim 2 wherein the polymer of the outer layer of the acrylic graft rubber particles has a glass transition temperature of 50° C. or more, the resilient acrylic copolymer of the adjacent inner layer has a glass transition temperature of 10° C. or less; and the alkyl methacrylate resin employed in the dispersion of an alkyl methacrylate resin has a glass transition temperature of 50° C. or more.

5. The method of claim 4 wherein the amount of alkyl methacrylate resin in the dispersion of an alkyl methacrylate resin is sufficient to result in the presence of 70–98% by weight acrylic graft rubber based on weight of rubber and said alkyl methacrylate resin in the resulting mixture obtained after carrying out both coagulations.

* * * * *